(12) United States Patent
Allstrom (10) Patent No.: US 10,353,364 B2
(45) Date of Patent: Jul. 16, 2019

(54) APPLICATION SPECIFIC FIELD DEVICE FOR PROCESS CONTROL SYSTEM

(71) Applicant: Invensys Systems, Inc., Foxboro, MA (US)

(72) Inventor: Peter Allstrom, Warwick, RI (US)

(73) Assignee: Schneider Electric Systems USA, Inc., Foxboro, MA (US)

( * ) Notice: Subject to any disclaimer, the term of this patent is extended or adjusted under 35 U.S.C. 154(b) by 532 days.

(21) Appl. No.: 15/145,549

(22) Filed: May 3, 2016

(65) Prior Publication Data
US 2017/0322531 A1    Nov. 9, 2017

(51) Int. Cl.
G05B 19/042    (2006.01)
G06F 9/44      (2018.01)

(52) U.S. Cl.
CPC ....... G05B 19/042 (2013.01); G05B 19/0423 (2013.01); G05B 2219/25112 (2013.01); G05B 2219/25428 (2013.01)

(58) Field of Classification Search
CPC ............. G05B 19/042; G05B 19/0423; G05B 2219/25112; G05B 2219/25428
USPC ......................................................... 717/173
See application file for complete search history.

(56) References Cited

U.S. PATENT DOCUMENTS

| | | | | |
|---|---|---|---|---|
| 5,915,085 A * | 6/1999 | Koved | ................. | G06F 21/54 726/1 |
| 6,865,732 B1 * | 3/2005 | Morgan | ................. | H04L 67/02 709/203 |
| 2002/0097979 A1 * | 7/2002 | Lowthert | ................. | H04N 5/76 386/261 |
| 2004/0059867 A1 * | 3/2004 | Heinemann | .......... | G05B 19/042 711/112 |
| 2006/0123383 A1 * | 6/2006 | Apte | .................. | G06F 8/61 717/100 |
| 2010/0125427 A1 * | 5/2010 | Gaiser | ................. | G01F 23/00 702/55 |
| 2016/0188322 A1 * | 6/2016 | De Groot | ............... | G06F 8/665 717/169 |

FOREIGN PATENT DOCUMENTS

| | | | | |
|---|---|---|---|---|
| DE | 102013108478 A1 * | 2/2015 | ............ | G06F 8/665 |
| DE | 102013108478 A1 | 2/2015 | | |
| EP | 1533670 A1 | 5/2005 | | |
| EP | 2869148 A1 | 5/2015 | | |

OTHER PUBLICATIONS

Grossmann et al., "OPC UA based Field Device Integration", SICE, 2008, 6pg. (Year: 2008).*
Koshy et al., "VM: Synthesizing Scalable Runtime Environments for Sensor Networks", ACM, 2005, 12pg. (Year: 2005).*
Extended European Search Report for 17167824.6, dated Nov. 13, 2017 (8 pages).

* cited by examiner

Primary Examiner — Ryan D. Coyer
(74) Attorney, Agent, or Firm — Stinson LLP (57) ABSTRACT

A field device for use in a process control system having embedded firmware stored in a a nonvolatile memory. The firmware includes computer-executable instructions for performing fixed behaviors and/or standard measurements as well as a runtime interpreter. The interpreter executes application specific code downloaded to the field device. When executed, the application specific code performs custom field device functions.

19 Claims, 5 Drawing Sheets

APPLICATION SPECIFIC FIELD DEVICE FOR PROCESS CONTROL SYSTEM

BACKGROUND

Instruments used in a process control (e.g., factory automation) system, such as transmitters and other field devices, provide predefined, fixed functionality that limits the ability of the devices to meet customer specific application needs. In other words, the devices often require customization to meet the specific needs of a process control system. For example, if a vortex flow meter is located near an impeller base pump, the meter may erroneously detect a pump impeller pulse as flow under certain conditions. Because this specific condition is not typical, generating an alarm for the error would require modifying the firmware embedded in the flow meter. In other words, a specific application would need to be written for the flow meter. Conventional field-based transmitters and the like run embedded firmware that requires lengthy development and testing. As such, changing the firmware for a custom solution is difficult and undesirable. Even if modifying the transmitter's firmware can provide a custom solution, it would make the transmitter unique to the specific condition, resulting in spare parts issues.

SUMMARY

Aspects of the present invention overcome the limitations of the prior art and improve the field of process control and automation through a downloadable mechanism that can add new application specific behaviors to a field device without impacting its embedded firmware. Such a mechanism permits the use of field devices in applications that require application specific behaviors without modifying the standard measurements and behaviors of the devices.

In an aspect, a field device for use in a process control system comprises a processor and a nonvolatile memory. The memory stores embedded firmware with computer-executable instructions that, when executed by the processor, perform at least one of a fixed behavior and a measurement to implement a predetermined function of the field device. The firmware also includes computer-executable instructions that perform a runtime interpreter. The interpreter executes application specific code, which is downloaded to the memory separate from the embedded firmware, to perform a custom function of the field device.

A computer-implemented method of operating a field device for use in a process control system embodies further aspects of the invention. The method includes performing at least one of a fixed behavior and a measurement in embedded firmware to implement a predetermined function of the field device. The method also includes performing a runtime interpreter in embedded firmware. The interpreter executes application specific code, which is downloaded to a memory of the field device separate from the embedded firmware, to perform a custom function of the field device.

In another aspect, a process control system includes a communications infrastructure, a sensor generating sensor data, and a transmitter coupled to the communications infrastructure and to the sensor. The transmitter is configured for receiving the sensor data and includes a processor and a nonvolatile memory. The memory stores embedded firmware that performs a standard measurement as a function of the received sensor data and a runtime interpreter. The interpreter executes application specific code, which is downloaded via the communications infrastructure to the memory separate from the embedded firmware, to implement a custom function of the transmitter.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Other features will be in part apparent and in part pointed out hereinafter.

BRIEF DESCRIPTION OF DRAWINGS

Corresponding reference characters indicate corresponding parts throughout the drawings.

DETAILED DESCRIPTION

Figure 1:
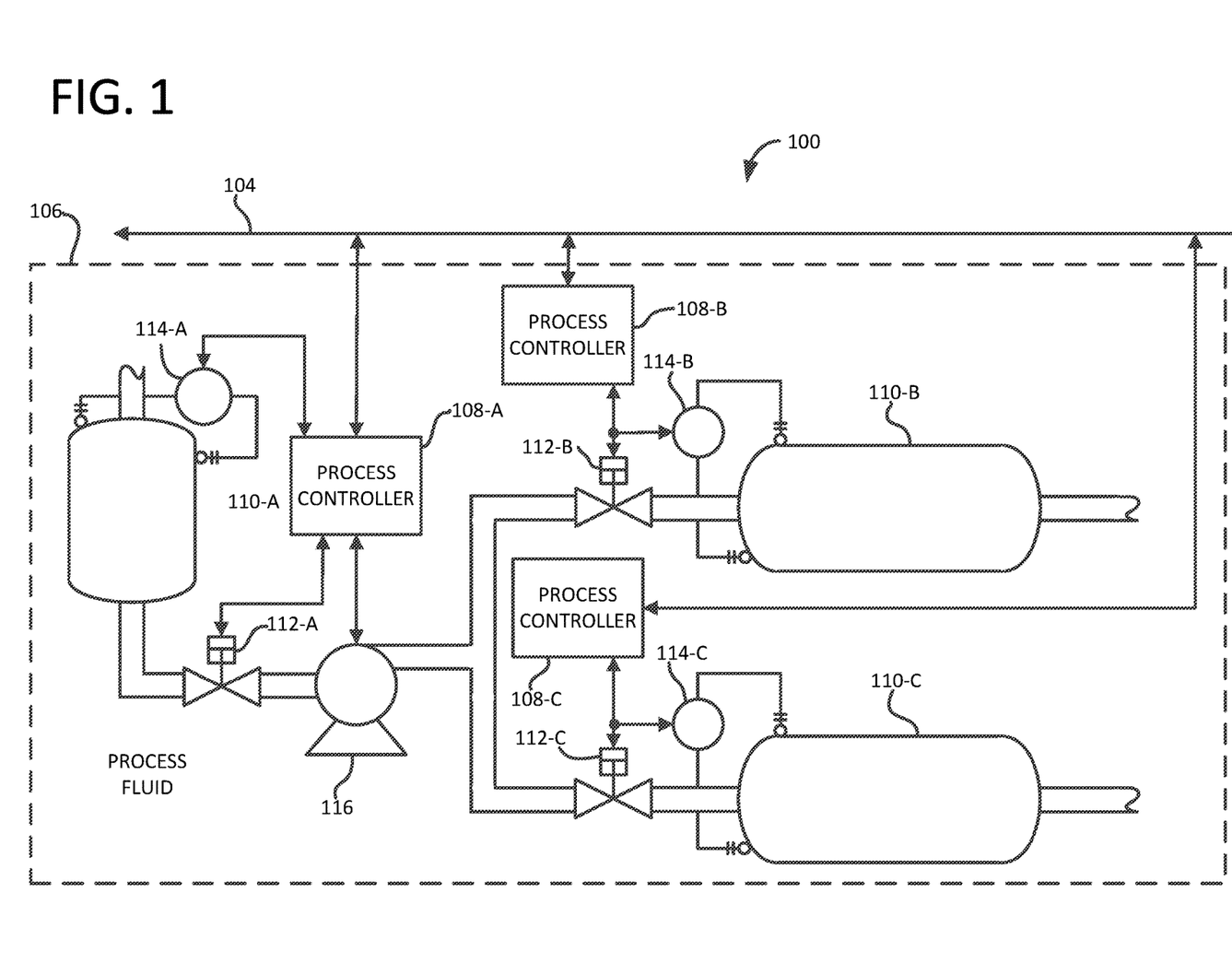
FIG. 1 illustrates an exemplary industrial process system within which aspects of the invention may be incorporated.

FIG. 1 illustrates an exemplary system, generally indicated at 100, within which an embodiment of the invention may be incorporated. The system 100 includes a communications infrastructure 104 and an exemplary plant, such as a fluid processing system 106. As illustrated, the fluid processing system 106 includes process controllers 108, tanks 110, valves 112, field devices 114, and a pump 116. In an embodiment, the communications infrastructure 104, process controllers 108, and field devices 114 comprise a process control system. In system 100, the process controllers 108, tanks 110, valves 112, field devices 114, and pump 116 are communicatively coupled via the communications infrastructure 104.

Aspects of the present invention overcome the limitations of the prior art and improve the field of process control and automation through a downloadable mechanism (e.g., via communications infrastructure 104) that can add new application specific behaviors to one or more of field devices 114 without impacting their embedded firmware.

The communications infrastructure 104 is capable of facilitating the exchange of data among various components of system 100, including components of fluid processing system 106 (e.g., process controllers 108, valves 112, field devices 114, etc.). The communications infrastructure 104 in the embodiment of FIG. 1 includes a local area network (LAN) that is connectable to other telecommunications networks, including other LANs or portions of the Internet or an intranet. The communications infrastructure 104 may be any telecommunications network that facilitates the exchange of data, such as those that operate according to the IEEE 802.3 (e.g., Ethernet) and/or the IEEE 802.11 (e.g., Wi-Fi) protocols, for example. In another embodiment, communications infrastructure 104 is any medium that allows data, such as data in the form of 4 to 20 mA, 1 to 5 V dc, and/or pulse output signals, to be physically transferred through serial or parallel communication channels (e.g., copper wire, optical fiber, computer bus, wireless communication channel, etc.).

The field devices 114 include but are not limited to measurement devices such as: pressure transmitters; temperature transmitters, sensors, and thermowells; flow and/or density transmitters for liquid, gas, and steam; sensors, analyzers, and transmitters for on-line liquid analytical measurements; and intelligent buoyancy transmitters and radar solutions for level measurement. The field devices 114 further include but are not limited to instrumentation devices such as: valve positioners; recorders, controllers, and configurators for use with measurement devices; and pneumatic instruments for measuring, recording, and controlling. In an embodiment, field devices 114 are configured for communication according to one or more of 4 to 20 mA, 1 to 5 V dc (low power), pulse output, or digital communications using HART®, FOXCOM®, PROFIBUS™, FOUNDATION™ FIELDBUS, or the like.

Still referring to the example of FIG. 1, the fluid processing system 106 is adapted for changing or refining raw materials to create end products. It will be apparent to one skilled in the art that aspects of the present invention are capable of optimizing processes and processing systems other than fluid processing system 106 and that system 106 is presented for illustration purposes only. Additional exemplary processes include, but are not limited to, those in the chemical, oil and gas, food and beverage, pharmaceutical, water treatment, and electrical power industries. For example, processes may include conveyers, power distribution systems, and/or processes or operations that cannot be interrupted. In an embodiment, process controllers 108 provide an interface or gateway between components of fluid processing system 106 (e.g., valves 112, field devices 114, pump 116) and other components of system 100.

The process controllers 108 of FIG. 1 are adapted to control and/or monitor aspects of fluid processing system 106. In an embodiment, processor controllers 108 are programmable logic controllers (PLC) that control and collect data from aspects of fluid processing system 106. In another embodiment, process controllers 108 are adapted to execute real-time applications that receive configuration data values and real-time data values from segmented database 102, as further described herein.

In a further aspect, process control system 100 is adapted for controlling variables in processes that change or refine raw materials to create end products. Processes include, but are not limited to, those in the chemical, oil and gas, food and beverage, pharmaceutical, water treatment, and power industries. For example, system 100 controls factors such as the proportion of one ingredient to another, the temperature of materials, how well ingredients are mixed, and the pressure under which materials are held.

Figure 2:
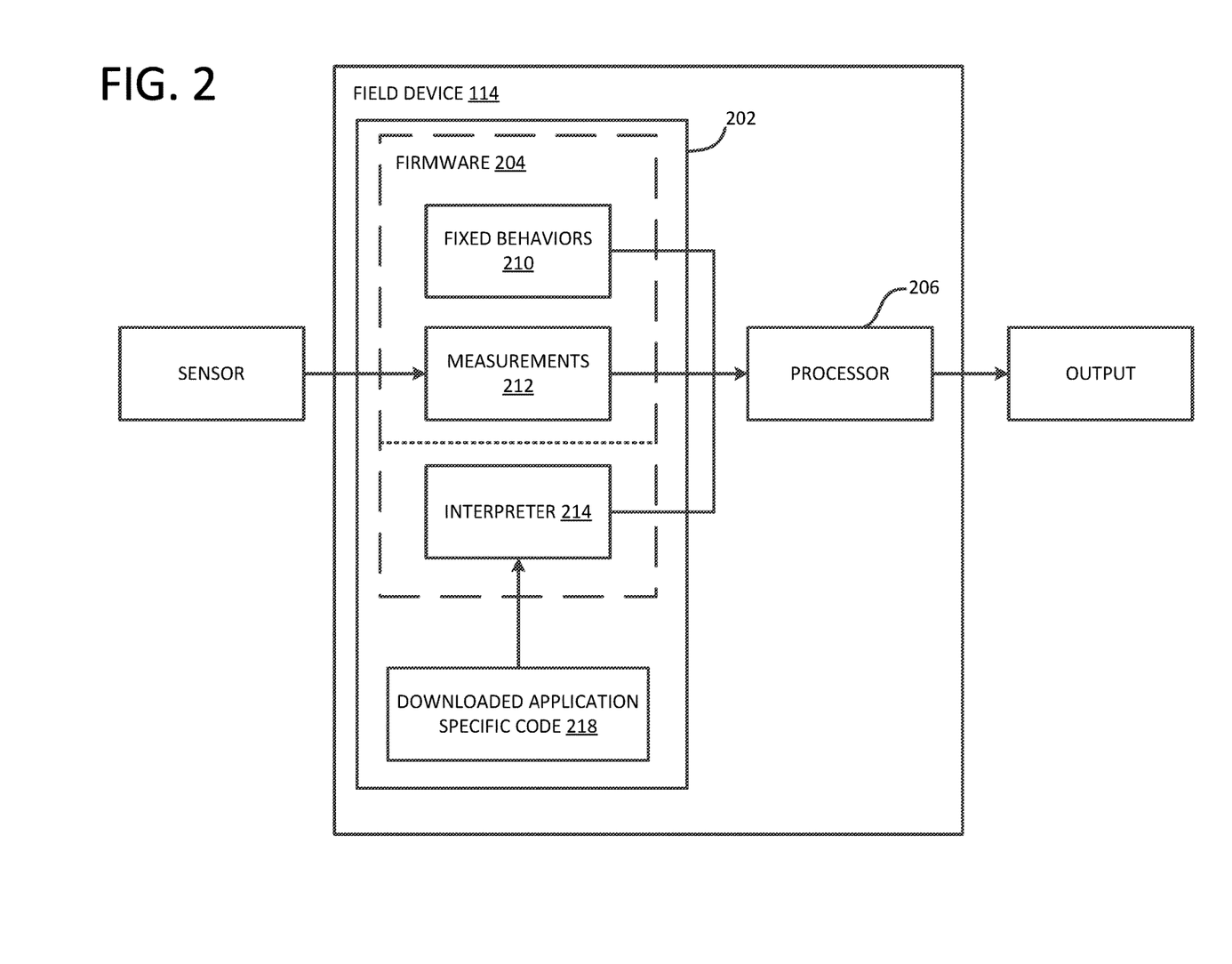
FIG. 2 is a block diagram of a field device for use in an industrial process system according to an embodiment of the invention.

Referring now to FIG. 2, a field device 114 embodying aspects of the invention includes a memory 202 having firmware 204 embedded therein. The firmware 204 includes computer-executable instructions that, when executed by a processor 206, implement one or more standard or fixed behaviors 210 (e.g., diagnostics, error detection, communications, etc.) and/or perform one or more measurement functions 212 (e.g., calculating flow rate, density, viscosity, Reynolds number, mass flow, etc.). As shown, the computer executable instructions of firmware 204 further include a runtime interpreter 214 embedded in the memory 202.

In an embodiment, the interpreter 214 directly executes code 218 downloadable over the wire and stored in a nonvolatile memory (e.g., memory 202) to perform one or more application specific functions of field device 114. The interpreter 214 is preferably flexible and memory efficient, and the code 218 runs in its own protected memory space.

Because interpreter 214 is part of firmware 204, which will have been thoroughly tested during development, interpreter 214 likewise will have been thoroughly tested. Advantageously, interpreter 214 cannot affect the standard processing time of measurements 212 and/or behaviors 210 of field device 114. In an embodiment, interpreter 214 adds new measurements and/or behaviors derived from a device's standard outputs and is not permitted to modify the device's standard measurements and behaviors.

As an example, an application specific add-in for the vortex flow meter transmitter described above is downloaded to the transmitter to provide the desired behavior. In this example, the application specific behavior comprises setting an alarm if a particular vortex frequency is seen, such as when the flow meter erroneously detects a pump impeller pulse as flow:

```
MxUserValue0= 0.0f;
// Over 300 Hz is not normal and is cause by the pump
if (VortexFreq > 300.0f)
{
    MxUserValue0= 1.0f; // Used to Set Alarm;
}
```

Figure 3:
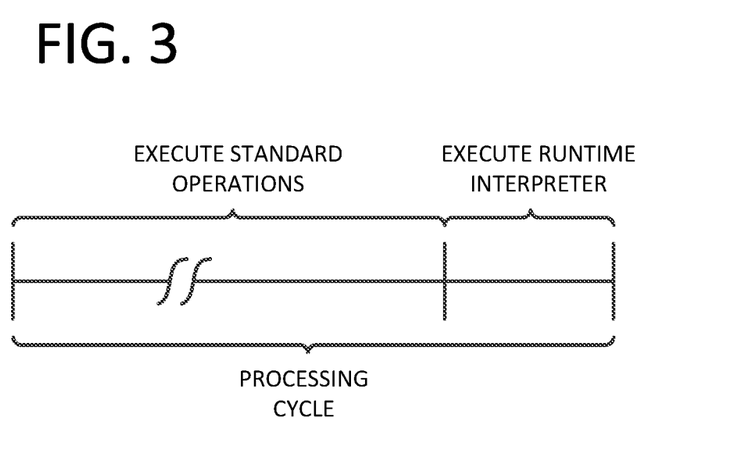
FIG. 3 illustrates an exemplary processing cycle of the field device of FIG. 2.

In operation, interpreter 214 does not affect the rate at which the standard measurements 212 update. Referring to FIG. 3, processor 206 first executes all standard operations, i.e., fixed behaviors 210 and measurements 212. After all standard transmitter measurements are updated, processor 206 calls interpreter 214 for execution. The interpreter 214 is allowed to run for a predefined maximum amount of time. If the application specific code 218 cannot be finished in the allotted time, interpreter 214 pauses rather than delaying the standard operations of field device 114. After processor 206 executes the standard operations, interpreter 214 resumes running the application specific code 218 where it left off. In this embodiment, interpreter 214 could take several standard processing cycles to complete but ensures the standard processing cycle is maintained. Once the interpreter 214 completes application specific code 218, it runs from the beginning again. In an embodiment, application specific code 218 includes math operations and/or program flow instructions, and can be configured to access more complicated predefined internal functions. Advantageously, interpreter 214 keeps track of the time it takes to perform these operations to ensure the maximum allocated time is not exceeded.

Figure 4:
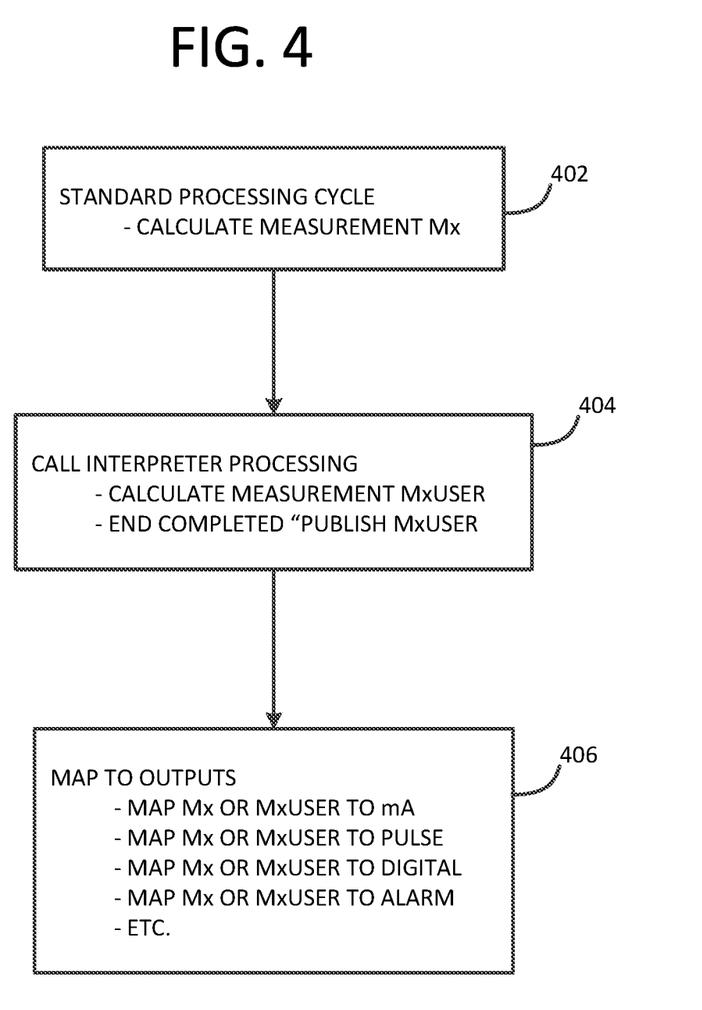
FIG. 4 is an exemplary flow diagram illustrating operation of a processor of the field device of FIG. 2.

According to aspects of the invention, interpreter 214 is configurable for producing new user defined measurements. These measurements can have the same attributes as standard measurements, such as a value, engineering unit code, or status. FIG. 4 is an exemplary flow diagram illustrating operation of processor 206 of the field device 114. Beginning at 402, processor 206 begins a standard processing cycle. In this instance, processor 206 executes measurements 212 to calculate a measurement Mx, which represents any measurement. After completing the standard portion of the processing cycle, processor 206 proceeds to 404 at which it calls runtime interpreter 214 to run the application specific code 218. In the illustrated example, the interpreter processing calculates a new, user-defined, application specific measurement, namely, MxUser. After completing its processing, interpreter 214 publishes the measurement MxUser. At 406, the processor 206 of field device 114 maps the measurements to outputs, such as: map Mx or MxUser to a mA output, map Mx or MxUser to a pulse output, map Mx or MxUser to a digital output, map Mx or MxUser to an alarm output, etc.

The interpreter 214 comprises a number of enumerated operations. These operations allow read access to a limited number of predefined internal data fields where the outputs are the predefined user measurements. The user has the option to map the user defined measurement to an output in the same way that standard measurements can be mapped. This applies to outputs such as mA, pulse, alarm, digital, etc. The outputs are not explicitly controlled by the interpreter 214 to ensure visibility and control to the output behavior.

Figure 5:
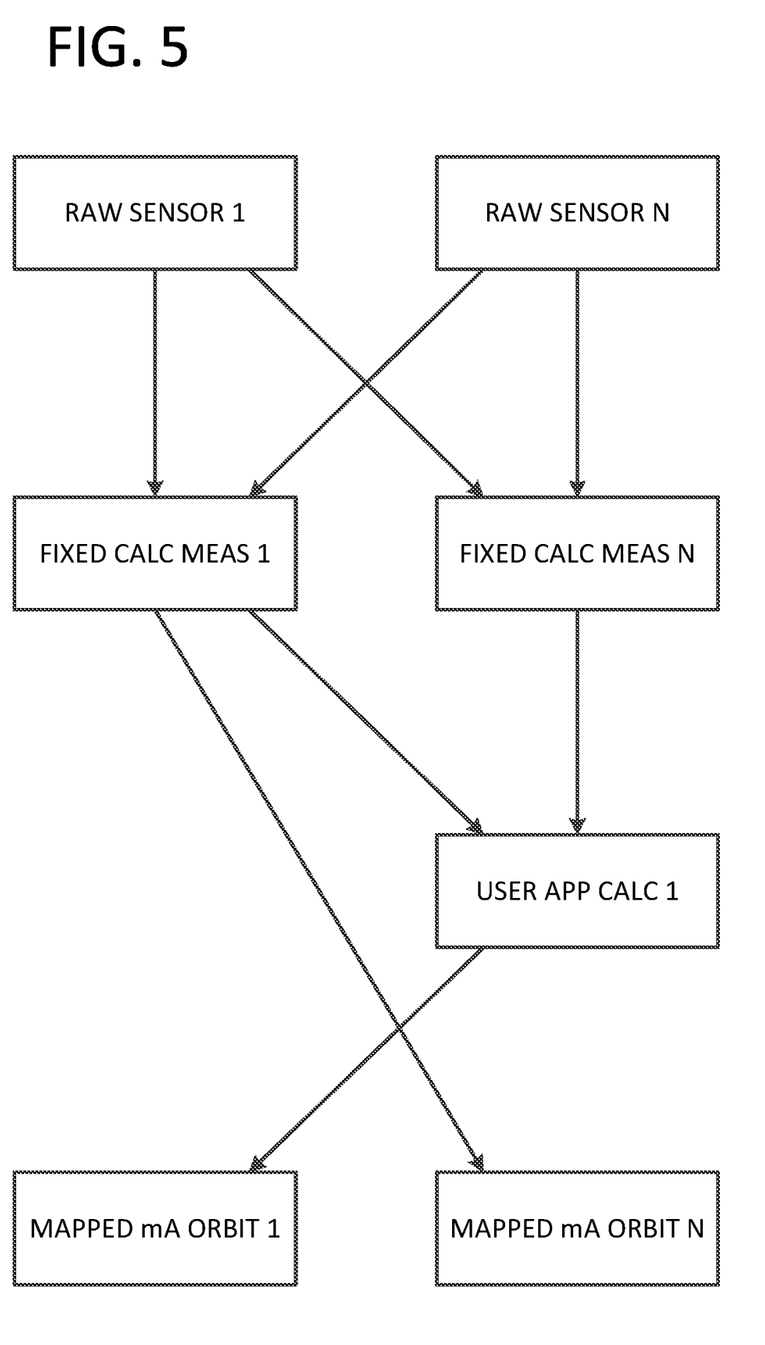
FIG. 5 is an exemplary flow diagram illustrating mapping of outputs of the field device of FIG. 2.

FIG. 5 further illustrates an exemplary mapping of the user defined measurements to outputs in the same manner as standard measurements. This allows a user measurement to be used for controlling, for example, the mA output, pulse output, alarm 10, and/or measurement commands that are sent back to the control system via a digital link (e.g., communications interface 104).

According to aspects of the invention, processor 206 uses, for example, "Publish" and "Publish Post" instructions at the end of the interpreter cycle to ensure atomic publishing of the results. The last instruction is an "END" instruction, which indicates interpreter 214 has completed running application specific code 218 and can restart the next cycle.

The following are examples of instructions executed by interpreter 214 that can operate on a variety of data types (singles, shorts, bytes, etc.):

1 Load Constant
2 Load Source
3 Load Source Partial
4 Publish Post
5 Publish
6 Add
7 Multiply
8 Divide
9 Subtract
10 Power
11 if < goto X
12 if > goto X
13 if <=goto X
14 if >=goto X
15 if ==goto X
16 if !=goto X
17 Goto X
18 end
19 And
20 or
21 not
22 Shift Left
23 Shift Right
24 InternalFunction1( )

The following are examples of application specific code 218 using the instructions above:

Example 1

| | Operation | | Comment |
|---|---|---|---|
| 1. | LoadSource | #0, 0.0f | Set StackReg0 to 0.0f (the answer) |
| 2. | LoadSource | #1, S1 | Reads S1 in to StackReg1 |
| 3. | Loadsource | #2, 300.0f | Set StackReg2 to 300.0f |
| 4. | If (#1 < #2) goto 6 | | Set Multiply StackReg1* 1.5f store StackReg1 |
| 5. | LoadSource | #0, 1.0f | Set the StackReg0 to 1.0f (the answer) |

-continued

| | Operation | | Comment |
|---|---|---|---|
| 6. | Publish | #0, MxUser0 | Publish StackReg0 to Temporary MxUser0 |
| 7. | PublishPost | | Publish all pending temporary variable to public locations |
| | End | | Indicate done (indication start over) |

Example 2

| | Operation | | Comment |
|---|---|---|---|
| 1. | LoadSource | #1, M1 | Reads M1 in to StackReg1 |
| 2. | Multiply | #1, 1.5f | Multiply StackReg1* 1.5f store StackReg1 |
| 6. | Publish | #1, MxUser 0 | Publish StackReg1 to Temporary MxUser0 |
| 7. | PublishPost | | Publish all pending temporary variable to public locations |
| | End | | Indicate done (indication start over) |

Embodiments of the present invention may comprise a special purpose computer including a variety of computer hardware, as described in greater detail below.

Embodiments within the scope of the present invention also include computer-readable media for carrying or having computer-executable instructions or data structures stored thereon. Such computer-readable media can be any available media that can be accessed by a special purpose computer and includes both volatile and nonvolatile media, removable and non-removable media. By way of example, and not limitation, computer-readable storage media include both volatile and nonvolatile, removable and non-removable media implemented in any method or technology for storage of information such as computer readable instructions, data structures, program modules or other data. Computer storage media are non-transitory and include, but are not limited to, random access memory (RAM), read only memory (ROM), electrically erasable programmable ROM (EEPROM), flash memory, ferroelectric RAM (FRAM), compact disk ROM (CD-ROM), digital versatile disks (DVD), or other optical disk storage, solid state drives (SSDs), magnetic cassettes, magnetic tape, magnetic disk storage, or other magnetic storage devices, or any other medium that can be used to carry or store desired program code means in the form of computer-executable instructions or data structures and that can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which aspects of the invention may be implemented. Although not required, aspects of the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that aspects of the invention may be practiced in network computing environments with many types of computer system configurations, including personal computers, hand-held devices, multiprocessor systems, microprocessor-based or programmable consumer electronics, network PCs, minicomputers, mainframe computers, and the like. Aspects of the invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An exemplary system for implementing aspects of the invention includes a general purpose computing device in the form of a conventional computer, including a processing unit, a system memory, and a system bus that couples various system components including the system memory to the processing unit. The system bus may be any of several types of bus structures including a memory bus or memory controller, a peripheral bus, and a local bus using any of a variety of bus architectures. The system memory includes nonvolatile and volatile memory types. A basic input/output system (BIOS), containing the basic routines that help transfer information between elements within the computer, such as during start-up, may be stored in ROM. Further, the computer may include any device (e.g., computer, laptop, tablet, PDA, cell phone, mobile phone, a smart television, and the like) that is capable of receiving or transmitting an IP address wirelessly to or from the internet.

The computer may also include a magnetic hard disk drive for reading from and writing to a magnetic hard disk, a magnetic disk drive for reading from or writing to a removable magnetic disk, and an optical disk drive for reading from or writing to removable optical disk such as a CD-ROM or other optical media. The magnetic hard disk drive, magnetic disk drive, and optical disk drive are connected to the system bus by a hard disk drive interface, a magnetic disk drive-interface, and an optical drive interface, respectively. The drives and their associated computer-readable media provide nonvolatile storage of computer-executable instructions, data structures, program modules, and other data for the computer. Although the exemplary environment described herein employs a magnetic hard disk, a removable magnetic disk, and a removable optical disk, other types of computer readable media for storing data can be used, including magnetic cassettes, flash memory cards, digital video disks, Bernoulli cartridges, RAMs, ROMs, SSDs, and the like.

Communication media typically embody computer readable instructions, data structures, program modules or other data in a modulated data signal such as a carrier wave or other transport mechanism and includes any information delivery media.

One or more aspects of the invention may be embodied in computer-executable instructions (i.e., software), routines, or functions stored in system memory or nonvolatile memory as application programs, program modules, and/or program data. The software may alternatively be stored remotely, such as on a remote computer with remote application programs. Generally, program modules include routines, programs, objects, components, data structures, etc. that perform particular tasks or implement particular abstract data types when executed by a processor in a computer or other device. The computer executable instructions may be stored on one or more tangible, non-transitory computer readable media (e.g., hard disk, optical disk, removable storage media, solid state memory, RAM, etc.) and executed by one or more processors or other devices. As will be appreciated by one of skill in the art, the functionality of the program modules may be combined or distributed as desired in various embodiments. In addition, the functionality may be embodied in whole or in part in firmware or hardware equivalents such as integrated circuits, application specific integrated circuits, field programmable gate arrays (FPGA), and the like.

The computer may operate in a networked environment using logical connections to one or more remote computers. The remote computers may each be another personal computer, a tablet, a PDA, a server, a router, a network PC, a peer device, or other common network node, and typically include many or all of the elements described above relative to the computer. The logical connections include a local area network (LAN) and a wide area network (WAN) that are presented here by way of example and not limitation. Such networking environments are commonplace in office-wide or enterprise-wide computer networks, intranets and the Internet.

When used in a LAN networking environment, the computer is connected to the local network through a network interface or adapter. When used in a WAN networking environment, the computer may include a modem, a wireless link, or other means for establishing communications over the wide area network, such as the Internet. The modem, which may be internal or external, is connected to the system bus via the serial port interface. In a networked environment, program modules depicted relative to the computer, or portions thereof, may be stored in the remote memory storage device. It will be appreciated that the network connections shown are exemplary and other means of establishing communications over wide area network may be used.

Preferably, computer-executable instructions are stored in a memory, such as the hard disk drive, and executed by the computer. Advantageously, the computer processor has the capability to perform all operations (e.g., execute computer-executable instructions) in real-time.

The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

Embodiments of the invention may be implemented with computer-executable instructions. The computer-executable instructions may be organized into one or more computer-executable components or modules. Aspects of the invention may be implemented with any number and organization of such components or modules. For example, aspects of the invention are not limited to the specific computer-executable instructions or the specific components or modules illustrated in the figures and described herein. Other embodiments of the invention may include different computer-executable instructions or components having more or less functionality than illustrated and described herein.

When introducing elements of aspects of the invention or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the invention in detail, it will be apparent that modifications and variations are possible without departing from the scope of aspects of the invention as defined in the appended claims. As various changes could be made in the above constructions, products, and methods without departing from the scope of aspects of the invention, it is intended that all matter contained in the above description and shown in the accompanying drawings shall be interpreted as illustrative and not in a limiting sense.

What is claimed is:

1. A field device for use in a process control system comprising:
   a processor; and
   a nonvolatile memory storing embedded firmware, said firmware including computer-executable instructions that, when executed by the processor, perform:
      at least one of a fixed behavior and a measurement to implement a predetermined function of the field device; and
      a runtime interpreter, said interpreter executing application specific code to perform a custom function of the field device, wherein the application specific code is downloaded to the memory separate from the embedded firmware;
   wherein the processor is configured to repeatedly execute a processing cycle, each processing cycle including a first portion during which the processor performs the at least one fixed behavior or measurement and a second portion during which the interpreter executes the application specific code, the second portion of the processing cycle having the same duration during each processing cycle,
   wherein the processor is configured to complete performance of the at least one fixed behavior or measurement during the first portion of each processing cycle and the interpreter is configured to execute after the processor completes processing to perform the at least one fixed behavior or measurement during each processing cycle.

2. The field device of claim 1, wherein the processor pauses the interpreter when the duration of the second portion of the processing cycle has lapsed in each processing cycle before completing processing of the downloaded application specific code.

3. The field device of claim 2, wherein the processor resumes the interpreter for continued processing of the downloaded application specific code in the second portion of the processing cycle executed subsequent to the interpreter being paused.

4. The field device of claim 1, wherein the processor is configured to receive information from a sensor and is responsive to the received information for performing the measurement function of the field device to generate a standard measurement.

5. The field device of claim 4, wherein the custom function implemented by the application specific code comprises a custom measurement function and the interpreter is responsive to the information received from the sensor to generate a custom measurement.

6. The field device of claim 5, wherein the firmware further includes computer-executable instructions that, when executed by the processor, perform mapping at least one of the standard measurement and the custom measurement to an output.

7. The field device of claim 6, wherein the application specific code implements user-defined mapping to at least one of the following outputs: mA, pulse, alarm, and digital.

8. The field device of claim 1, wherein the firmware further includes computer-executable instructions that, when executed by the processor, perform publishing the custom function.

9. The field device of claim 1, wherein the custom function implemented by the application specific code comprises a custom behavior.

10. The field device of claim 1, wherein the interpreter is configured to execute the application specific code to perform the custom function such that the custom function cannot modify the at least one fixed behavior or measurement.

11. A computer-implemented method of operating a field device for use in a process control system comprising:
    repeatedly executing a processing cycle; and
    in each processing cycle;
       during a first portion of the processing cycle, performing to completion at least one of a fixed behavior and a measurement in embedded firmware to implement a predetermined function of the field device; and
       during a second portion of the processing cycle following the first portion, performing a runtime interpreter in embedded firmware, wherein the interpreter executes application specific code to perform a custom function of the field device, and wherein the application specific code is downloaded to a memory of the field device separate from the embedded firmware;
    wherein the second portion of each processing cycle is the same duration during each processing cycle.

12. The method of claim 11, further comprising pausing the interpreter while executing of the downloaded application specific code when the duration of the second portion of a first processing cycle has lapsed.

13. The method of claim 12, further comprising resuming the interpreter for continued execution of the downloaded application specific code at the onset of the second portion of a second processing cycle subsequent to the first processing cycle.

14. The method of claim 11, further comprising receiving sensor data and, responsive to the received data, performing the measurement function of the field device to generate a standard measurement.

15. The method of claim 14, wherein the custom function implemented by the application specific code comprises a custom measurement function and the interpreter is responsive to the information received from the sensor to generate a custom measurement.

16. The method of claim 15, further comprising mapping at least one of the standard measurement and the custom measurement to an output.

17. A process control system comprising:
a communications infrastructure;
a sensor generating sensor data;
a transmitter coupled to the communications infrastructure and to the sensor, said transmitter configured for receiving the sensor data, said transmitter including:
a processor; and
a nonvolatile memory storing embedded firmware, said firmware including computer-executable instructions that, when executed by the processor, perform:
a standard measurement as a function of the received sensor data; and
a runtime interpreter, said interpreter executing application specific code to implement a custom function of the transmitter, wherein the application specific code is downloaded via the communications infrastructure to the memory separate from the embedded firmware;
wherein the processor is configured to repeatedly execute a processing cycle, each processing cycle including a first portion during which the processor performs the at least one fixed behavior or measurement and a second portion during which the interpreter executes the application specific code, the second portion of the processing cycle having the same duration during each processing cycle,
wherein the processor is configured to complete performance of the at least one fixed behavior or measurement during the first portion of each processing cycle and the interpreter is configured to execute after the processor completes processing to perform the at least one fixed behavior or measurement during each processing cycle.

18. The system of claim 17, wherein the processor pauses the interpreter when the duration of the second portion of the processing cycle has lapsed in each processing cycle before completing processing of the downloaded application specific code.

19. The system of claim 18, wherein the processor resumes the interpreter for continued processing of the downloaded application specific code-in the second portion of the processing cycle executed subsequent to the interpreter being paused.

* * * * *